(12) United States Patent
Meswani et al.

(10) Patent No.: US 10,503,655 B2
(45) Date of Patent: Dec. 10, 2019

(54) DATA BLOCK SIZING FOR CHANNELS IN A MULTI-CHANNEL HIGH-BANDWIDTH MEMORY

(71) Applicant: Advanced Micro Devices, Inc., Sunnyvale, CA (US)

(72) Inventors: Mitesh R. Meswani, Austin, TX (US); Jee Ho Ryoo, Austin, TX (US)

(73) Assignee: ADVANCED MICRO DEVICES, INC., Santa Clara, CA (US)

(*) Notice: Subject to any disclaimer, the term of this patent is extended or adjusted under 35 U.S.C. 154(b) by 481 days.

(21) Appl. No.: 15/216,524

(22) Filed: Jul. 21, 2016

(65) Prior Publication Data
US 2018/0024935 A1    Jan. 25, 2018

(51) Int. Cl.
*G06F 12/0893* (2016.01)
*G06F 13/00* (2006.01)

(52) U.S. Cl.
CPC .......... *G06F 12/0893* (2013.01); *G06F 13/00* (2013.01); *G06F 2212/1024* (2013.01); *G06F 2212/60* (2013.01)

(58) Field of Classification Search
CPC ................ G06F 12/0893; G06F 13/00; G06F 2212/1024; G06F 2212/60
See application file for complete search history.

(56) References Cited

U.S. PATENT DOCUMENTS

| | | | |
|---|---|---|---|
| 6,349,364 B1 * | 2/2002 | Kai ..................... | G06F 12/0886 711/129 |
| 2017/0109274 A1 * | 4/2017 | Lee ..................... | G06F 12/0638 |
| 2017/0212840 A1 * | 7/2017 | Le ....................... | G06F 12/0895 |

OTHER PUBLICATIONS

Honarmand, Main Memory and DRAM, Jun. 2015, Stony Brook University (Year: 2015).*

* cited by examiner

*Primary Examiner* — Larry T Mackall
(74) *Attorney, Agent, or Firm* — Park, Vaughan, Fleming & Dowler LLP

(57) ABSTRACT

The described embodiments include a computing device that caches data acquired from a main memory in a high-bandwidth memory (HBM), the computing device including channels for accessing data stored in corresponding portions of the HBM. During operation, the computing device sets each of the channels so that data blocks stored in the corresponding portions of the HBM include corresponding numbers of cache lines. Based on records of accesses of cache lines in the HBM that were acquired from pages in the main memory, the computing device sets a data block size for each of the pages, the data block size being a number of cache lines. The computing device stores, in the HBM, data blocks acquired from each of the pages in the main memory using a channel having a data block size corresponding to the data block size for each of the pages.

17 Claims, 7 Drawing Sheets

DATA BLOCK SIZING FOR CHANNELS IN A MULTI-CHANNEL HIGH-BANDWIDTH MEMORY

BACKGROUND

Field

The described embodiments relate to computing devices. More specifically, the described embodiments relate to data block sizing for channels in a multi-channel high-bandwidth memory.

Related Art

Many computing devices include cache memories (or "caches") that are used to locally store copies of data acquired from a main memory so that the data is more readily available for use in processing circuits. For example, some computing devices include a hierarchy of caches with a smallest capacity (e.g., 64 kB) cache, a middle capacity (e.g., 2 MB) cache, and a largest capacity (e.g., 8 MB) cache. These caches are often implemented using static random access memory ("SRAM") circuits, which enable faster accesses, but are more expensive to implement than other types of memory circuits (due to larger numbers of transistors in SRAM, larger amounts of silicon area per SRAM memory circuit, etc.).

Because SRAM is expensive to implement, capacities for caches are typically limited. As can be seen above, capacities for even the largest caches in the computing device are on the order of a few MB, whereas main memory is commonly a thousand times larger (e.g., 8 GB). In order to best use the limited capacity of the caches, numerous techniques have been proposed to maximize the amount of useful data stored in caches (i.e., data that is most likely to be accessed by the processing circuits). For example, one such technique involves using smaller "data management granularity." Generally, when a portion of data (e.g., a 64 B cache line) is acquired from main memory to be stored in a cache, a block of data including the portion of data and other/extra nearby portion(s) of data is typically acquired. Acquiring data in this way, particularly given that many programs access data in localized areas of the memory, can enable computing devices to access not only the portion of data in the cache, but opportunistically access the extra portions of data that are included in the block of data in the cache. When the extra data is stored in the cache but not used, however, the performance of the computing device can suffer, as useful data may be evicted from the cache to make room for the extra data. By using a smaller granularity for data management, the computing devices acquire a reduced amount of extra data when acquiring the portion data from the main memory. Using the smaller granularity can avoid acquiring too much data, but can also mean that more accesses of main memory (which are slow, power consuming, etc.) are needed to acquire data.

BRIEF DESCRIPTION OF THE FIGURES

Throughout the figures and the description, like reference numerals refer to the same figure elements.

DETAILED DESCRIPTION

Figure 1:
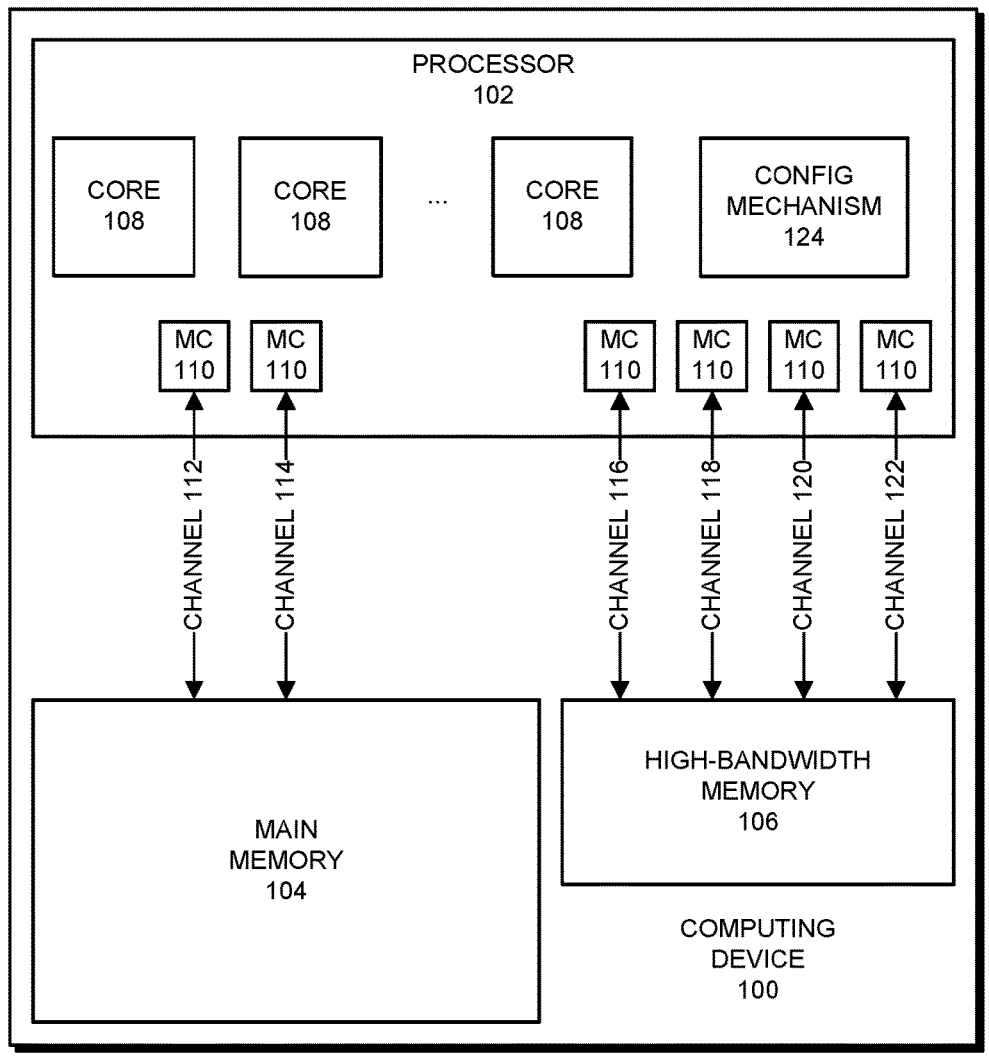
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments. Thus, the described embodiments are not limited to the embodiments shown, but are to be accorded the widest scope consistent with the principles and features disclosed herein.

Terminology

In the following description, various terms may be used for describing embodiments. The following section provides a simplified and general description of some of these terms. Note that some or all of the terms may have significant additional aspects that are not recited herein for clarity and brevity and thus these descriptions are not intended to limit the terms.

Cache line: a cache line is a portion of data that is stored in a high-bandwidth memory that is being used as a cache and/or in other caches in a computing device. In some embodiments, cache lines are of a predefined size, such as 64 bytes (64 B), 128 B, or another size.

Page: a page is a portion of data in main memory in a computing device from which data can be acquired and stored as one or more cache lines in a cache. In some embodiments, pages are of a predefined size. For example, in some embodiments, pages are 2 KB in size and/or a size that can be accessed (read, written, etc.) in a single access of the main memory, e.g., read from a buffer in main memory without refreshing the buffer. As another example, an operating system page of 4 KB may be used, a predefined block size of 12 KB may be used, etc.

Workload: a workload includes sequences of computational operations. For example, a workload may include computational operations for software applications, operating systems, test or benchmark software, etc. A workload (or, rather, the corresponding computational operations) may access data in a cache to enable the computational operations.

Overview

The described embodiments include a computing device that uses a high-bandwidth memory as a cache for storing data acquired from a main memory. In using the high-bandwidth memory as a cache, the described embodiments configure the high-bandwidth memory so that data blocks stored in the high bandwidth memory include specified numbers of cache lines based on characteristics of a workload being executed by the computing device.

The high-bandwidth memory includes one or more memory devices (integrated circuit chips, etc.) that are coupled to a processor in the computing device via multiple channels. Each channel includes signal routes for accessing (reading data from, writing data to, etc.) a corresponding portion of the one or more memory devices. In the described embodiments, each of the channels is configurable so that data blocks stored in the corresponding portion of the one or more memory devices include a specified number of cache lines, i.e., are of a specified size. For example, a channel C that is used to access an N-byte portion (e.g., 512 MB) of an M-byte (e.g., 1 GB) memory device in the high-bandwidth memory may be configured so that data blocks stored in the N-byte portion include K cache lines (e.g., 1, 15, etc.). In some embodiments, the size of data blocks selected for each channel is set based on a workload being executed by the computing device.

In the described embodiments, data accesses made to cache lines in the high-bandwidth memory are monitored and records of the data accesses are used to set data block sizes for pages of data (e.g., memory pages, etc.). In other words, based on the data accesses made to cache lines acquired from a page in the high-bandwidth memory, a data block size, in terms of a number of cache lines in the data block, is set for the page. Setting the data block size as described means that, when data is acquired from the page to be stored in the high-bandwidth memory, a specified number of cache lines are acquired and stored in the high-bandwidth memory.

In the described embodiments, based on the data block sizes for pages, the computing device designates one or more channels, which have associated data block sizes (as described above), to be used for storing, in the high-bandwidth memory, data blocks acquired from the pages. For example, if the data block size for a page is five cache lines, a channel that is configured for storing data blocks of five or more cache lines is designated for storing data blocks from the page.

In the described embodiments, the computing device uses the above-described records of data accesses in determining which cache lines are to be acquired from pages for generating the data blocks. For example, if a cache line at a given address in a page is recorded as having earlier been accessed, the cache line may be copied from the given address into a corresponding portion of the data block. Some embodiments include translation logic, which is a circuit that is configured to use the record of data accesses determining cache lines to be included in data blocks.

By setting data block sizes for the channels and setting data block sizes for pages as described, the described embodiments enable configuring data block sizes appropriate for projected cache line accesses. In other words, the described embodiments improve the operation of a memory system in the computing device and better use cache capacity by avoiding copying data from main memory to the high-bandwidth memory that is less likely to be used (based, as described above, on the record of data accesses). This in turn enables the described embodiments to cache more useful data in the high-bandwidth memory and better use memory system bandwidth (e.g., on data buses, in controllers, etc.), which can improve the overall operation of the computing device.

Computing Device

FIG. 1 presents a block diagram illustrating a computing device in accordance with some embodiments. As can be seen in FIG. 1, computing device 100 includes processor 102, main memory 104, and high-bandwidth memory 106. Processor 102 is a functional block that performs computational operations for computing device 100. Processor 102 includes a number of cores 108, each of which is a functional block that performs computational operations. For example, each core 108 may include one or more central processing units (CPU), graphics processing units (GPU), embedded processors, application-specific integrated circuits (ASIC), digital signal processors, etc. Processor 102 also includes a number of memory controllers ("MC") 110 and configuration mechanism ("CONFIG MECHANISM") 124, which are described below.

Main memory 104 is a functional block that stores data and instructions for other functional blocks in computing device 100. Main memory 104 includes memory circuits such DRAM, double data rate (DDR) synchronous dynamic random access memory (SDRAM), PCM, non-volatile memory (flash, etc.), and/or other types of memory circuits, as well as control circuits for handling accesses of the instructions and data that are stored in the memory circuits.

High-bandwidth memory 106 is a functional block that stores data and instructions for other functional blocks in computing device 100. High-bandwidth memory 106 includes memory circuits such DRAM, DDR SDRAM, and/or other types of memory circuits, as well as control circuits for handling accesses of the instructions and data that are stored in the memory circuits. In some embodiments, high-bandwidth memory 106 includes one or more stacks of DRAM chips (or "stacked DRAM") that are used for storing data and instructions.

Memory controllers 110 in processor 102 are functional blocks that perform operations for managing the exchange of data between processor 102 and main memory 104 and high-bandwidth memory 106. For example, memory controllers 110 may perform reads, writes, and/or other data accesses in main memory 104, may perform configuration and control operations for memory devices in main memory 104 (e.g., control data refreshes for dynamic memory devices, etc.), etc.

Channels 112-122 are coupled between corresponding memory controllers 110 and either main memory 104 (channels 112-114) or high-bandwidth memory 106 (channels 116-122). Each of the channels includes one or more communication paths (e.g., serial communication paths, a parallel communication path, etc.) that are used for communicating data, instructions, commands, and/or other information between the corresponding memory controller 110 and main memory 104 or high-bandwidth memory 106. For example, the communication paths may include one or more of wires, guides, communication regions, vias, and/or other signal routes, as well as corresponding circuit elements (e.g., repeaters, buffers, pads, etc.).

In some embodiments, each of channels 112-122 provides access to a corresponding portion of main memory 104 and high-bandwidth memory 106. For example, an address space of high bandwidth memory 106 may be divided into four portions (e.g., 4 GB of address space may be divided into four 1 GB portions, etc.), with each of channels 116-122 providing access to a corresponding one of the portions.

In the described embodiments, some or all of high-bandwidth memory 106 is used as a cache for caching blocks of data (i.e., that include one or more cache lines) acquired from pages in main memory 104. The described embodiments therefore include one or more control and/or management mechanisms that enable the use of high-bandwidth memory 106 as a cache. For example, in some embodiments, high-bandwidth memory 106 includes tag arrays, monitoring mechanisms, cache controllers, and/or other mechanisms for ensuring cache coherency, for storing and evicting cache lines from high-bandwidth memory 106, etc. In some embodiments, an entire address space of computing device 100 is directed to main memory 104, so that all addresses in memory are directed to main memory 104. In these embodiments, all of the available memory in high-bandwidth memory 106 may be used as a cache. Alternatively, in some embodiments, only a portion of high-bandwidth memory 106 is used as a cache, with a remaining portion being used as ordinary memory—uniquely addressable using a corresponding portion of the addresses in the address space. The general functions of a cache, aside from the functions herein described, are known in the art and are therefore not described herein for brevity and clarity.

Figure 2:
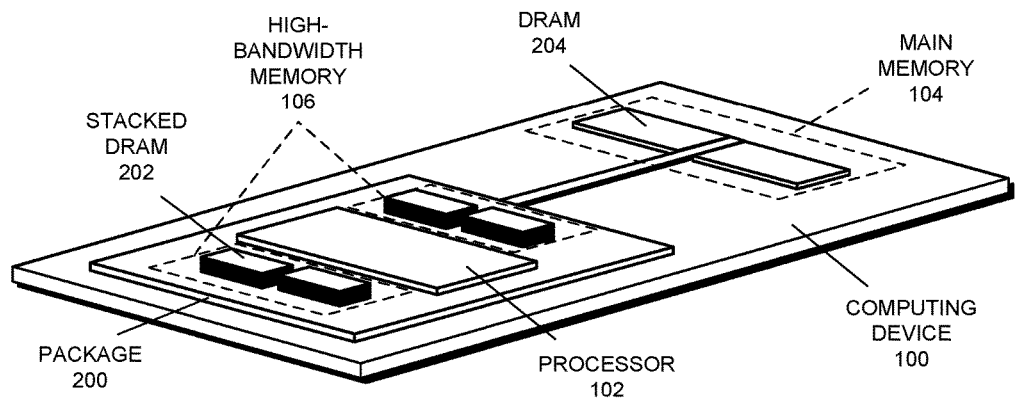
FIG. 2 presents a block diagram illustrating an isometric view of a computing device with a high-bandwidth memory in accordance with some embodiments.

FIG. 2 presents a block diagram illustrating an isometric view of a computing device with a high-bandwidth memory in accordance with some embodiments. As can be seen in FIG. 2, computing device 100 includes a package 200 on which a processor 102 (e.g., a processor integrated circuit chip) and four stacked DRAM modules are mounted or otherwise coupled (one of which is labeled stacked DRAM 202). Package 200 includes a chip package, an interposer, and/or another mounting or holding mechanism that may have communication routes (wires, guides, etc.) and/or circuitry via which processor 102 and the stacked DRAM modules communicate with one another and external devices. Computing device 100 also includes, external to package 200, two DRAM modules (one of which is labeled DRAM 204). Each of the four stacked DRAM modules mounted on package 200 includes a number of DRAM integrated circuit chips (i.e., having DRAM memory circuits, etc. fabricated thereon) that are arranged in a stack and communicatively coupled to each other and/or processor 102 via through-silicon vias (TSVs), inductive and/or capacitive communication, etc. The DRAM modules external to package 200 each include one or more DRAM integrated circuit chips coupled via one or more signal routes (e.g., a bus, etc.) to processor 102.

In some embodiments, the stacked DRAM modules mounted on package 200 and the DRAM modules external to package 200 are included in two levels of a multi-level memory hierarchy. For example, the stacked DRAM modules may be included in a first level of the multi-level memory hierarchy, and the DRAM modules external to package 200 may be included in a second level of the multi-level memory hierarchy. The levels with which the stacked DRAM and DRAM modules are included may be designated in consideration of access time and size as, in some embodiments, the stacked DRAM modules may be smaller in capacity but significantly faster for processor 102 to access then the DRAM modules external to package 200.

Figure 3:
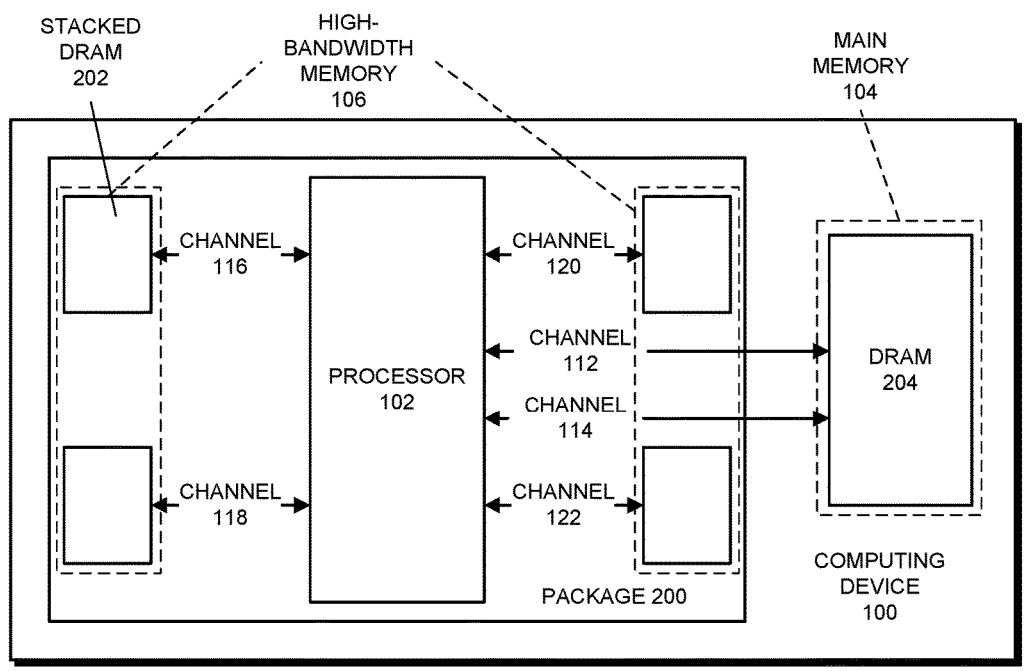
FIG. 3 presents a block diagram illustrating a top view of a computing device with a high-bandwidth memory in accordance with some embodiments.

FIG. 3 presents a block diagram illustrating a top view of a computing device with a high-bandwidth memory in accordance with some embodiments. The block diagram shown in FIG. 3 is a top view of a similar embodiment to the isometric view shown in FIG. 2, but with channels 112-122 illustrated. As shown in FIG. 3, channels 112-114 are coupled between processor 102 and DRAM module 204 (i.e., main memory 104). Channels 112-114 may be implemented as a signal bus, wires, routes, etc. that are coupled to corresponding signal routes in processor 102 and the DRAM modules. Channels 116-122 are each coupled between processor 102 and a corresponding stacked DRAM module (i.e., high-bandwidth memory 106) (only one stacked DRAM module is labeled in FIG. 3 for clarity). Channels 116-122 may be implemented via signal routes in/on package 200 that are coupled to corresponding signal routes in processor 102 and the corresponding stacked DRAM module.

Although a particular arrangement of elements is illustrated in computing device 100 in FIGS. 2-3, in some embodiments, different elements may be present. For example, in some embodiments, some or all of the processor and the stacked DRAM modules mounted on package 200 are enclosed in package 200. As another example, another number or arrangement of stacked DRAM modules or DRAM modules may be used. Generally, the described embodiments can use any number or arrangement of elements that perform the operations herein described.

Figure 4:
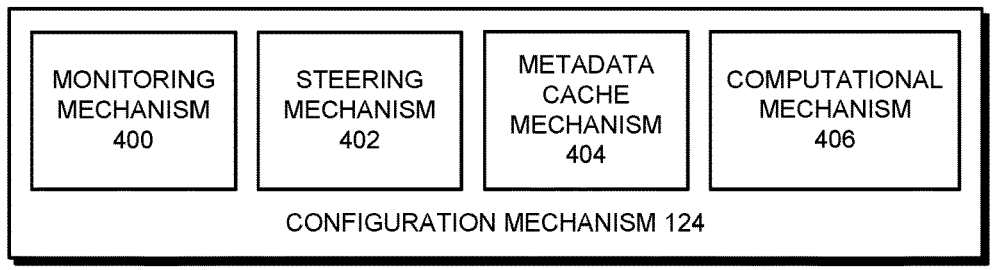
FIG. 4 presents a block diagram illustrating a configuration mechanism in accordance with some embodiments.

Configuration mechanism 124 is a functional block that performs operations associated with setting data block sizes for channels 116-122 and setting data block sizes and channels for pages. FIG. 4 presents a block diagram illustrating configuration mechanism 124 in accordance with some embodiments. As can be seen in FIG. 4, configuration mechanism 124 includes monitoring mechanism 400, steering mechanism 402, metadata cache mechanism 404, and computational mechanism 406. Generally, monitoring mechanism 400, steering mechanism 402, metadata cache mechanism 404, and computational mechanism 406 are implemented in hardware such as dedicated circuitry, general-purpose circuitry that executes instructions, etc.

Monitoring mechanism 400 monitors workloads being executed by cores 108 to detect patterns of data accesses and monitors accesses of cache lines to detect which cache lines in pages are accessed. For example, monitoring mechanism 400 may monitor and record, for a given workload, the number of cache lines being accessed for available pages in main memory 104.

Steering mechanism 402 determines, based on page information, channels where cache lines are to be accessed for pages and directs (or "steers") accesses accordingly. For example, upon an access request being made by one of cores 108 for data from a page (i.e., to access a cache line from the page), steering mechanism 402 determines which channel is being used to access the page and directs the request to the appropriate channel.

Metadata cache mechanism 404 is a cache that stores a limited number (e.g., 24, 36, etc.) of records of data accesses for pages (e.g., access information, dirty cache line information, and/or other information), with other/remaining records of data accesses stored in high-bandwidth memory 106 and/or main memory 104.

Computational mechanism 406 performs various computational operations for configuration mechanism 124, including operations relating to setting data block sizes for each of channels 116-122 (i.e., setting data block sizes for the portion of high-bandwidth memory 106 accessed using each of channels 116-122) and setting data block sizes for pages, as described herein.

Although configuration mechanism 124 is described as a single functional block, in some embodiments, some or all of the different constituent mechanisms shown in configuration mechanism 124 (monitoring mechanism 400, etc.) may be located in physically separate locations (e.g., separate functional blocks) and/or be located elsewhere in computing device 100. For example, monitoring mechanism 400 may include two separate monitoring mechanisms in hardware and/or software for monitoring each of the pattern of data accesses for workloads and the portions of cache lines that are accessed. Generally, the described embodiments include sufficient functional blocks and mechanisms to enable the operations herein described.

Although computing device 100 is described with a particular arrangement of functional blocks, some embodiments include a different number and/or arrangement of functional blocks. For example, some embodiments have multiple processors 102 and/or a different number of cores (as shown by the ellipsis in FIG. 1). Generally, in the described embodiments, computing device 100 can include any number or arrangement of functional blocks that perform the operations herein described.

Computing device 100 is simplified for illustrative purposes. In some embodiments, computing device 100 includes additional and/or different functional blocks or elements for performing the operations herein described and/or other operations. For example, computing device 100 may include mass storage devices (disks, large non-volatile semiconductor memories, etc.), power subsystems (AC power, batteries, etc.), media processing subsystems, networking subsystems, display subsystems, heating/cooling subsystems, communication subsystems (e.g., a northbridge, a southbridge, etc.), peripheral devices, I/O devices, etc.

Computing device 100 can be, or can be included in, any type of electronic device. For example, computing device 100 can be, or can be included in, electronic devices such as desktop computers, laptop computers, wearable computing devices, tablet computers, smart phones, servers, network appliances, toys, audio-visual equipment (stereo receivers, televisions, projectors, set top boxes, etc.), home appliances, vehicles (autos, trucks, airplanes, etc.), industrial controllers, and/or other electronic devices.

Setting Data Block Sizes for Channels

The described embodiments set data block sizes for channels for a high-bandwidth memory. Generally, "data blocks" as used herein are blocks (portions, sections, etc.) of data acquired from the main memory and stored the high-bandwidth memory. The data blocks can include any number of cache lines, from one cache line up to the number of cache lines that will fit in a page in memory (e.g., 2 KB, etc.). The "size" of a data block therefore indicates of a number of cache lines that are to be included in the data block.

Figure 5:
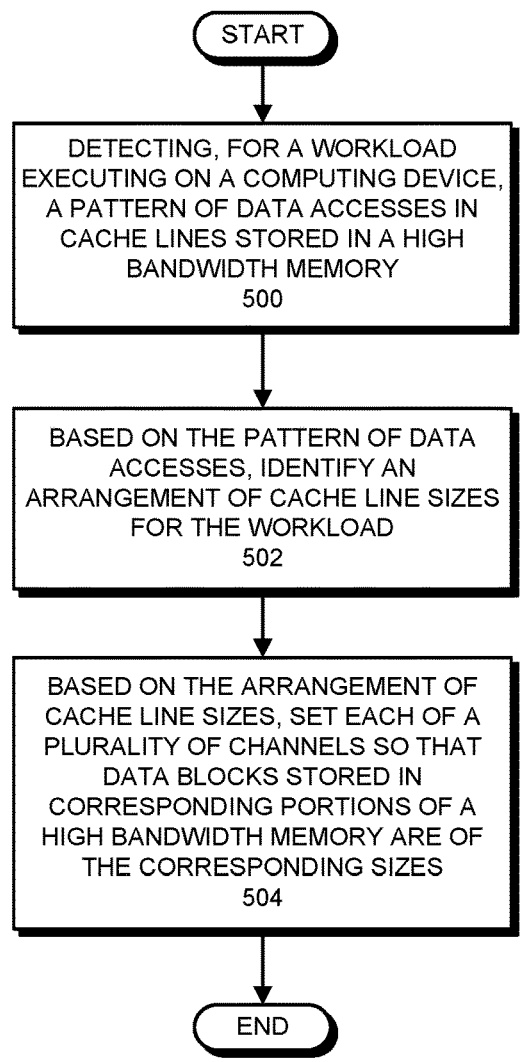
FIG. 5 presents a flowchart illustrating a process for setting data block sizes for channels in accordance with some embodiments.

FIG. 5 presents a flowchart illustrating a process for setting data block sizes for channels in accordance with some embodiments. Note that the operations shown in FIG. 5 are presented as a general example of operations performed by some embodiments. The operations performed by other embodiments include different operations and/or operations that are performed in a different order. Additionally, although certain mechanisms/elements are used in describing the operations, in some embodiments, other mechanisms perform the operations and/or the operations are performed on other mechanisms/elements.

For the example in FIG. 5, it is assumed that the channels are all set to a default size of 2 KB data blocks. Although a 2 KB default data block size is assumed for this example, another default size may used (e.g., 1 KB, 4 KB, etc.) and/or each channel may be set to store a corresponding size of data blocks, with one or more of the channels storing different sized data blocks than the other channels.

The process shown in FIG. 5 starts when a computing device (e.g., monitoring mechanism 400), while executing a workload, detects a pattern of data accesses of cache lines stored in the high-bandwidth memory (step 500). Recall that, when executing the workload, data accesses of the main memory cause 2 KB data blocks (i.e., that include 32 64 B cache lines) to be copied from pages in the main memory to available locations in the high-bandwidth memory. The computing device then monitors data accesses of cache lines in the data blocks and generates records of the cache lines that are accessed. For example, the computing device may keep, for each available 2 KB page in the main memory, a bitmask in which each bit position represents a corresponding 64 B cache line. Each bitmask may start, when a page is copied into the high-bandwidth memory, with all 32 positions containing a 0, which represents "not accessed" for each of the cache lines in the page. When a particular cache line is accessed in the high-bandwidth memory (written to, read from, etc.), the computing device updates the corresponding bit to a 1, which represents "accessed." The "pattern" of data accesses, i.e., the actual accesses of cache lines from the page, for the workload can be determined based on the bitmasks. For example, bitmasks that were updated while the workload is executing may be collected into sets according to the number of cache lines from corresponding page that were accessed, and the sets can be used to determine the pattern of data accesses.

Based on the pattern of data accesses, the computing device (e.g., computational mechanism 406) identifies an arrangement of cache line sizes for the workload (step 502). For example, assume that the workload loaded 2 KB blocks of data from multiple pages. Further assume that the above-described pattern of data accesses (e.g., the bitmasks) indicates that, for 50% of accessed pages, the workload accessed three cache lines, and for the other 50% of the pages, the workload accessed ten cache lines. In this case, the arrangement of cache line sizes identified by the computing device for the workload is half three cache lines (three 64 B cache lines, or 192 B) and half ten cache lines (ten 64 B cache lines, or 640 B).

The computing device (e.g., computational mechanism 406) then sets, based on the arrangement of cache line sizes, each of a plurality of channels so that data blocks stored in corresponding portions of the high-bandwidth memory are of corresponding sizes (step 504). For this operation, the computing device configures one or more elements that control the storage of cache lines in the high-bandwidth memory via corresponding channels, e.g., steering mechanism 402, the memory controllers, etc., so that the corresponding portion of the high-bandwidth memory is allocated for data blocks that include a specified number of cache lines. Continuing the example above, and assuming the four channels to the high-bandwidth memory shown in FIG. 1, the computing device can set two of the four channels (i.e., half the channels) to store data blocks that are three cache lines in size, and the other two channels to store data blocks that are ten cache lines in size.

In the described embodiments, when a channel (i.e., the one or more controlling elements for the channel) has been set so that data blocks loaded to corresponding portions of the high-bandwidth memory are of corresponding sizes, the controlling element will ensure that data blocks loaded to the high-bandwidth memory for a given access of the main memory (e.g., for an access of a particular address) have the specified number of cache lines. Continuing the example above, for the channels that are set to store data blocks having three cache lines, the controlling element will ensure that three cache lines are acquired from the main memory and stored in the high-bandwidth memory.

Although data blocks of three and ten cache lines are described above (i.e., block sizes that match patterns of data accesses), in some embodiments, other sizes of data blocks may be used. For example, channels may be configured to store data blocks that are larger than the number of cache lines observed in the patterns of data accesses, e.g., four or five cache lines instead of three, etc. The extra space enables subsequent iterations of the workload to opportunistically load more cache lines with the data block in the high-bandwidth memory, while still substantially relating the number of cache lines in data blocks to the number of cache lines actually accessed by the workload. As another example, preset sizes of data blocks may be used, such as using power-of-two data blocks (having e.g., two cache lines, four cache lines, eight cache lines, etc.). In this case, instead of using a data block of three cache lines, a data block of a preset size (e.g., four cache lines, etc.) may be used.

In some embodiments, the process shown in FIG. 5 may be performed at any time, including repeating the process one or more times to again set (i.e., update) data block sizes for channels. In these embodiments, repeating the process may help to ensure that the data block sizes for the channels are more representative of the current profile of the workload, which may change over time with respect to cache line accesses.

Setting Data Block Sizes for Pages

Figure 6:
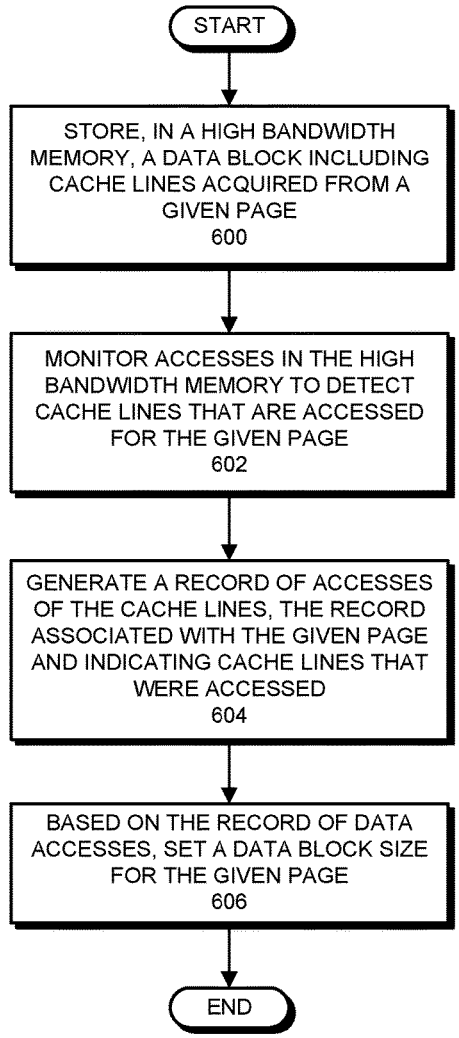
FIG. 6 presents a flowchart illustrating a process for setting data block sizes for pages in accordance with some embodiments.

The described embodiments set data block sizes for pages in a computing device. FIG. 6 presents a flowchart illustrating a process for setting data block sizes for pages in accordance with some embodiments. Note that the operations shown in FIG. 6 are presented as a general example of operations performed by some embodiments. The operations performed by other embodiments include different operations and/or operations that are performed in a different order. Additionally, although certain mechanisms/elements are used in describing the operations (e.g., a configuration mechanism, channels, etc.), in some embodiments, other mechanisms perform the operations and/or the operations are performed on other mechanisms/elements.

For the example in FIG. 6, it is assumed that the computing device is executing a similar (if not the same) workload, e.g., executing a same application, etc., as was executed while the data block size was set for the channels in FIG. 5. This assumption means that the data block size for the channels and the data block size for the given page are set for a similar workload. This can help to improve the execution of the workload by setting data block sizes for channels and data block sizes for pages so that accesses to the high-bandwidth memory (i.e., cache) are more appropriately matched to the workload. Note, however, that this is not a requirement; the data block sizes for the channels and the pages may be configured using different workloads, different combinations of workloads, etc. For example, the data block sizes for the channels may be set based on two or more workloads—e.g., an "average" data block size for a number of workloads that are switched in and out on the computing device, etc.

The process shown in FIG. 6 starts when the computing device stores, in the high-bandwidth memory, a data block including cache lines acquired from a given page (step 600). For example, a 2 KB data block that includes 32 cache lines may be acquired from the main memory and stored in the high-bandwidth memory based on a request from a software application, an operating system, and/or another requesting entity.

The computing device (e.g., monitoring mechanism 400) then monitors accesses of the cache lines in the data block in the high-bandwidth memory to detect cache lines that are accessed for the given page (step 602). For example, the computing device may monitor access addresses, access patterns (e.g., sequential addresses starting from a given base address, etc.), and/or other indicators of cache lines being accessed. The computing device then generates a record of the accesses of the cache lines, the record associated with the given page and indicating the cache lines that were accessed (step 604). For example, the configuration mechanism may keep, as the record of the data accesses of the cache lines for the given page, a record such as the above-described bitmask in which each bit position represents a corresponding 64 B cache line for the given page. The configuration mechanism may update the bitmask by writing a 1 to a corresponding position in the bitmask when a cache line is accessed. The bitmask can then be used to detect which of the cache lines were accessed by detecting which positions in the bitmask are set to 1.

In some embodiments, the above-described records of cache lines that were accessed (e.g., the bitmask) may be kept for future use. For example, in some embodiments, a small number of recently-used records (i.e., records for particular pages) may be stored in metadata cache mechanism 404, and any other records may be stored in the high-bandwidth memory or the main memory. As described herein, the records of data accesses/bitmasks may be used for various operations, including those in FIG. 5, etc. In some embodiments, only one monitoring step is performed for both of FIGS. 5-6, and the bitmasks are generated and subsequently used as described for both setting the data block size for the channels and setting the data block size for the pages.

The computing device (e.g., computational mechanism 406), based on the record of data accesses, sets a data block size for the given page (step 606). For this operation, the computing device determines, based on the record of data accesses, how many cache lines were accessed. For example, when using the above-described bitmask, the computing device can sum the 1 bits in the bitmask to arrive at a total of the cache lines accessed. The total of the cache lines accessed can then be used as the data block size for the given page. For example, if eight bit positions in the bitmask are set to 1, the data block size can be set to eight.

Figure 7:
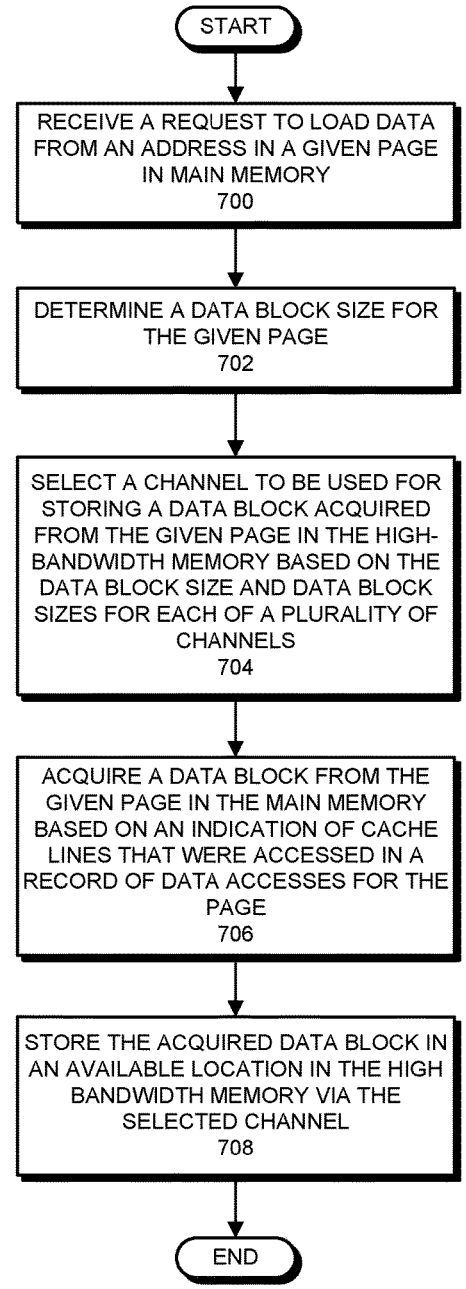
FIG. 7 presents a flowchart illustrating a process for using corresponding channels for caching data blocks in a high-bandwidth memory in accordance with some embodiments.

As described above, for the operations in FIG. 6, the computing device initially loads the full 2 KB page into the high-bandwidth memory. In some embodiments, the 2 KB page is a default page size, and is used initially to enable the computing device to generally determine the accesses of cache lines in the page. When the page is evicted and subsequently replaced in the cache (i.e., from the main memory), the amount of data loaded may be different than 2 KB. FIG. 7 describes operations where the above-described data block size for a page is used to determine how many cache lines are to be included in the data block for the page. The monitoring and setting operations of steps 602-604 can be performed for the smaller data block size in a similar way to the 2 KB data block size described above.

In some embodiments, the process shown in FIG. 6 may be performed at any time, including repeating the process one or more times to again set (i.e., update) data block sizes for pages. In these embodiments, repeating the process may help to ensure that the data block sizes for the pages are more representative of cache line accesses currently being made for data blocks acquired from the page.

Caching Data Blocks in the High-Bandwidth Memory

The described embodiments use corresponding channels for caching data blocks in a high-bandwidth memory. FIG. 7 presents a flowchart illustrating a process for using corresponding channels for caching data blocks in a high-bandwidth memory in accordance with some embodiments. Note that the operations shown in FIG. 7 are presented as a general example of operations performed by some embodiments. The operations performed by other embodiments include different operations and/or operations that are performed in a different order. Additionally, although certain mechanisms/elements are used in describing the operations (e.g., a processor, a configuration mechanism, etc.), in some embodiments, other mechanisms perform the operations and/or the operations are performed on other mechanisms/elements.

For the example in FIG. 7, it is assumed that the processes of FIGS. 5-6 have been performed. A data block size has therefore been set for channels to a high-bandwidth memory and a data block size has been set for pages in the main memory. More specifically, for the example in FIG. 7, the channels are assumed to be set as in the example in FIG. 5, with half the channels being set to data blocks of three cache lines and the other half of the channels being set to data blocks of ten cache lines. In addition, the given page from FIG. 6 is used in the example in FIG. 7, and the data block size for the given page is again assumed to be eight cache lines. Also, for the example in FIG. 7, it is assumed that the computing device is executing a similar (if not the same) workload, e.g., executing a same application, etc., as was executed during the operations for FIGS. 5-6. This can help to improve the execution of the workload as described above in the description of FIG. 6. Note, however, that executing the same workload is not a requirement.

The process shown in FIG. 7 starts when the computing device receives a request to load data from an address in a given page in main memory (step 700). For example, the processor (e.g., a particular core) may generate a request to load specified data for use by a software application that is being executed by the processor.

The computing device (e.g., configuration mechanism 124) then determines a data block size for the given page (step 702). For example, the data block size, which was determined using a process such as the process shown in FIG. 6, may be retrieved from a location where the data block size is stored in the computing device (e.g., a list, table, etc. in a register or in a memory). Alternatively, instead of earlier storing and retrieving the data block size for the page, the data block size may be determined from the record of data accesses during step 702 using a process similar to step 606 above—and step 606 may not be performed.

The computing device next selects a channel to be used for storing a data block acquired from the given page in the high-bandwidth memory based on the data block size for the given page and data block sizes for each of the plurality of channels (step 704). During this operation, the computing device compares the data block size for the given page to data block sizes for each of one or more of the channels to determine a channel for which the data block size is sufficient to hold a data block acquired from the given page. The data block size for the channel is sufficient when the data block size for the channel is at least as large at the data block size for the given page. For example, given that the data block size for the given page is eight cache lines and the choices of data block sizes for the channels are three cache lines and ten cache lines, the channels with the data block size of ten cache lines are sufficient, whereas the channels with the data block size of three cache lines are insufficient (i.e., too small).

Note that the data block size for the selected channel may not be an exact match with the data block size for the given page, i.e., may be a larger data block size than necessary to hold the data block from the given page. This is permissible and the computing device, when loading the data block from the given page as described below, can acquire extra cache lines from the given page to fill the additional space, mark the additional space as invalid, etc.

The computing device then acquires a data block from the given page in the main memory based on an indication of cache lines that were accessed in a record of data accesses for the page (step 706). For example, and continuing the example from FIG. 6, the computing device may check a bitmask to determine particular cache lines (e.g., by determining positions in the bitmask that are set to 1) that were accessed during a previous time that a data block from the given page was stored in the high-bandwidth memory. The computing device may then acquire (e.g., using translation logic such as in FIGS. 9-10) the cache lines for the data block from the given page. For example, if the record of data accesses shows that the eight cache lines in the following positions in the 2 KB page were previously accessed: 1, 4, 5, 10, 21, 22, 29, 31, the computing device acquires the corresponding cache lines from the given page in the main memory. As described above, two additional cache lines may be selected and acquired from the page in the main memory, thereby ensuring that the computing device has acquired the ten cache lines that will fit in the available space in the data block for the channel. For example, the two additional cache lines may be selected based on the request, randomly selected, selected according to one or more rules or guidelines, selected according to previous cache line use in the page and/or the computing device generally, etc.

In some embodiments, when data is requested from a particular address in the given page, the corresponding cache line is included in the data block even if the corresponding cache line is not listed as having been earlier accessed in the record of data accesses. Because there is space for extra cache lines in the data block the example above, the requested cache line can simply be included in the extra space. If there was no space, however, an earlier-accessed cache line may be left out of the data block to make space for the requested cache line. The cache line that is left out may be selected randomly, selected according to one or more rules or guidelines, etc.

The computing device next stores the acquired data block in an available location in the high-bandwidth memory via the selected channel (step 708). In storing the data as described, an available ten-cache-line location is allocated for storing the data block in the high-bandwidth memory, and the acquired data block is written to the allocated location. For example, an available ten-cache-line location starting from a particular address in the portion of the high-bandwidth memory accessible via the selected channel may be reserved for storing the acquired data block, and then the acquired data block may be stored in the location via the selected channel. Note that this operation includes using the signal routes of the selected channel to store the data in the allocated location.

In some embodiments, when a cache line in the given page that was not initially included in the data block stored in the high-bandwidth memory is subsequently requested (e.g., by a software application executed by the computing device), the computing device performs an operation to acquire the requested cache line and store the requested cache line in the high-bandwidth memory. For example, the computing device may evict a cache line from the data block stored in the high-bandwidth memory and replace the evicted cache line with the requested cache line. The particular cache line that is evicted can be selected using any of a number of different techniques, such as least-recently used, random, round-robin (with other evicted cache lines), etc. As another example, the data block size for the page can be increased and the page can be moved to another channel for which the data block size is sufficient. In these embodiments, the requested cache line is simply added to the appropriate spot in the data block in the portion of the high-bandwidth memory accessible via the other channel.

Writing Cached Data Back from the High-Bandwidth Memory

Figure 8:
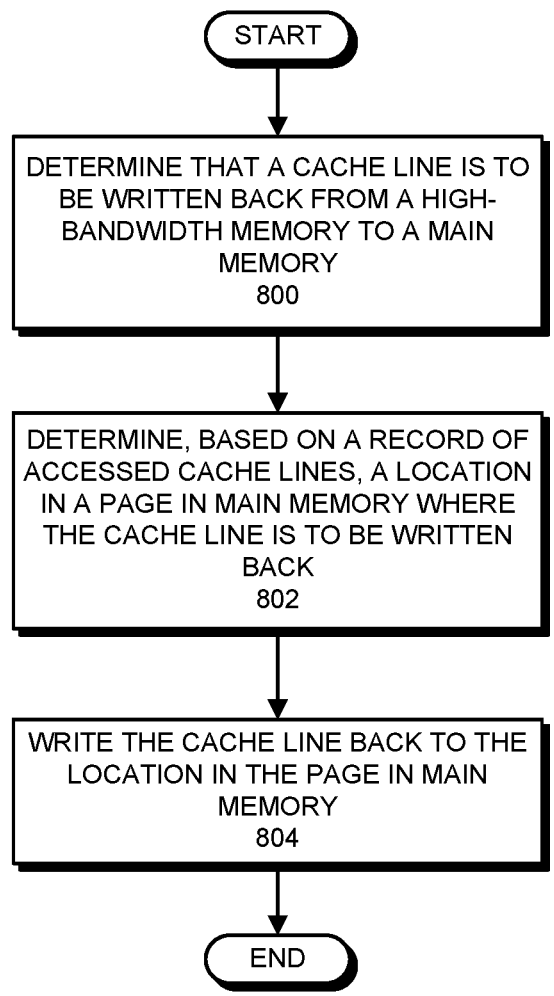
FIG. 8 presents a flowchart illustrating a process for writing back cached data from a high-bandwidth memory in accordance with some embodiments.

The described embodiments write back cached data (e.g., modified or "dirty" data) from the high-bandwidth memory to the main memory. FIG. 8 presents a flowchart illustrating a process for writing back cached data from a high-bandwidth memory in accordance with some embodiments. Note that the operations shown in FIG. 8 are presented as a general example of operations performed by some embodiments. The operations performed by other embodiments include different operations and/or operations that are performed in a different order. Additionally, although certain mechanisms/elements are used in describing the operations (e.g., a processor, a configuration mechanism, etc.), in some embodiments, other mechanisms perform the operations and/or the operations are performed on other mechanisms/elements.

For the example in FIG. 8, it is assumed that the process of FIG. 7 has been performed. A data block that includes a number of cache lines has therefore been stored in a location in a portion of the high-bandwidth memory via a selected channel.

The process shown in FIG. 8 starts when the computing device determines that a cache line is to be written from the high-bandwidth memory to a main memory (step 800). For example, the computing device may determine that the cache line is to be evicted to make space for one or more other cache lines, that the cache line has been requested by another entity (e.g., by another processor in a multi-processor system), etc.

The computing device then determines, based on a record of accessed cache lines (e.g., the same record of accessed cache lines that was used when the data block was acquired in FIG. 7) a location in a page in main memory where the cache line is to be written back (step 802). Continuing the example above, i.e., using the bitmask, this operation includes determining, based on the location of the cache line in the data block, a location to which the cache line is to be written in the main memory. This operation amounts to a determination of an offset or address in the page in main memory where the cache line is to be written. For example, if the record of data accesses shows that the eight cache lines in the following positions in the 2 KB page were previously accessed: 1, 4, 5, 10, 21, 22, 29, 31, and the second cache line in the data block is to be written back, the computing device determines that the cache line is to be written back to the 4th position in the 2 KB page in main memory or at a starting address 3×64 B away from a base address of the page. The computing device then writes the cache line back to the location in the page in main memory (step 804).

Resetting the Records of Cache Lines that were Accessed

In some embodiments, at specified times, the records of cache lines that were accessed (or "the records") are reset, cleared, replaced, or otherwise renewed. For example, a corresponding record may be cleared after cache lines in a data block are written back from the high-bandwidth memory to the main memory. As another example, the corresponding record may be cleared or otherwise replaced upon the data block being stored in the high-bandwidth memory, such as by storing/backing up the old record (which is kept to enable the eventual write back of cache lines from the high-bandwidth memory) and starting a new record. This resetting, and the eventual updating of the records via the process shown in FIG. 6, enables the records to reflect each time that the data block is loaded in the high-bandwidth memory. This can ensure that the records more accurately reflect a current cache line accessing behavior of the workload.

Translation Logic

Figure 9:
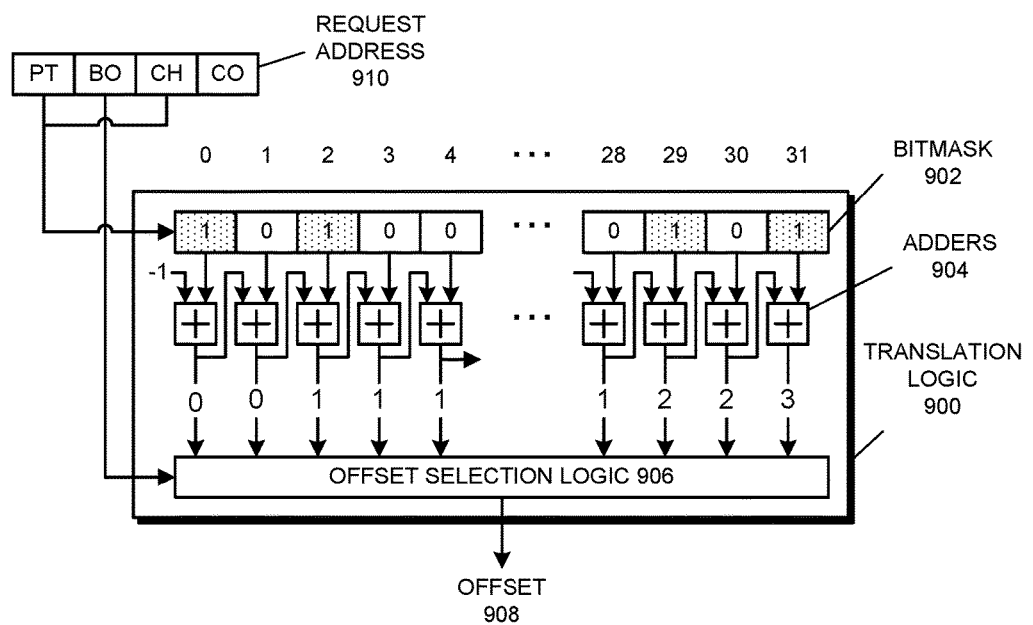
FIG. 9 presents a block diagram illustrating translation logic in accordance with some embodiments.
Figure 9:
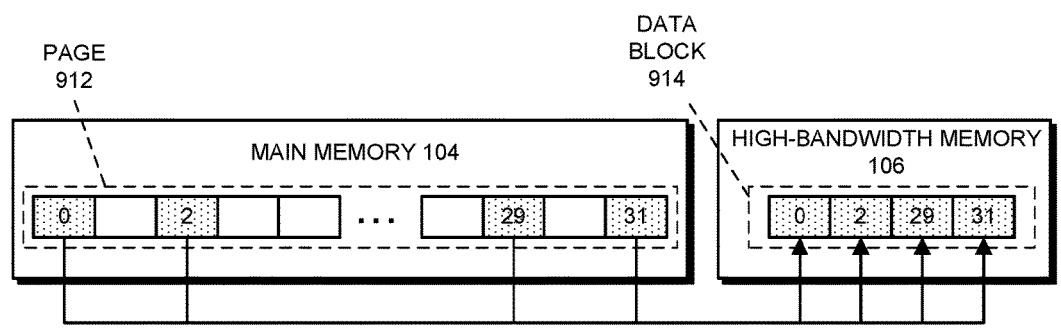
Figure 10:
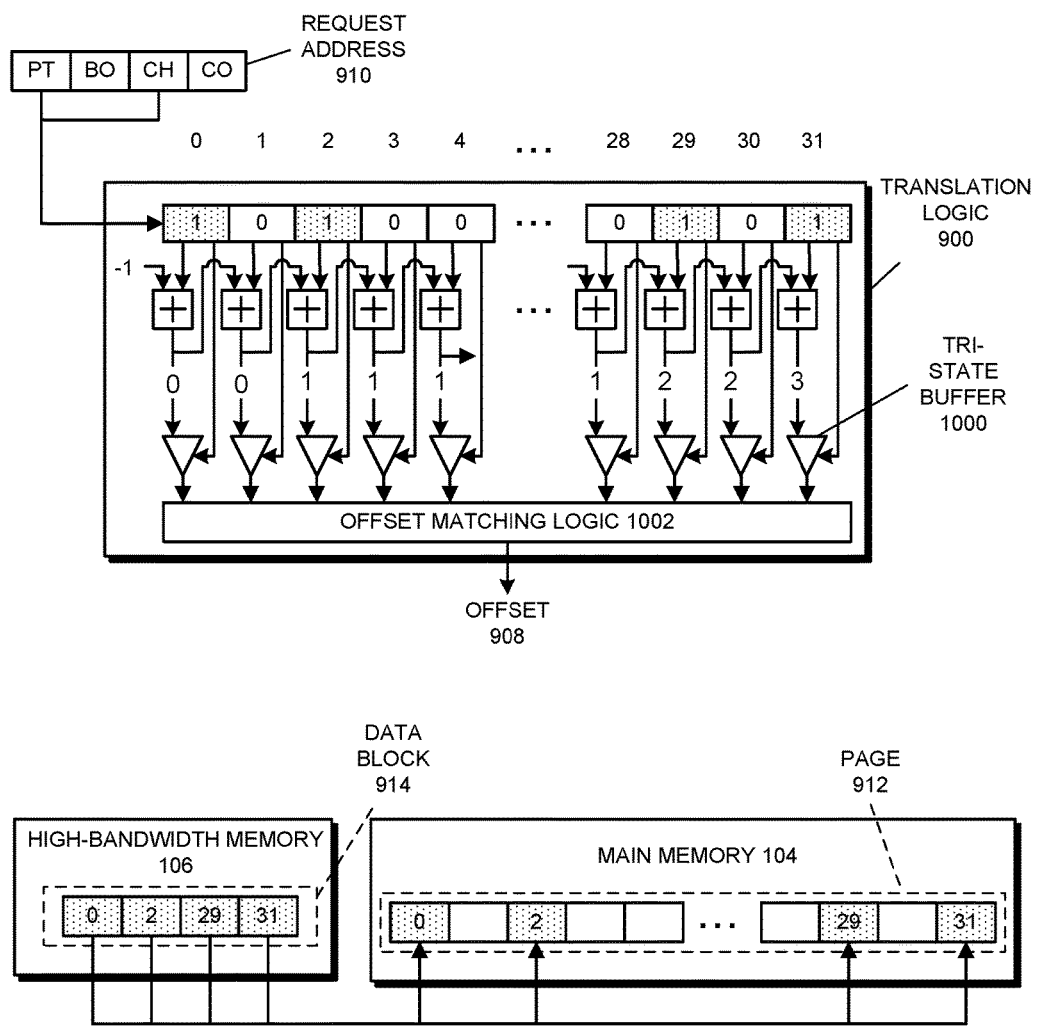
FIG. 10 presents a block diagram illustrating translation logic in accordance with some embodiments.

In some embodiments, translation logic is used to determine particular cache lines to be included in a data block acquired from pages in the main memory (e.g., step 706) and/or for determining locations in pages in main memory to which cache lines are to be written back from the high-bandwidth memory (e.g., step 802). In these embodiments, the translation logic is configured to make the determination based on the above-described bitmask (i.e., the record of accesses of cache lines in corresponding pages). FIGS. 9-10 present block diagrams illustrating translation logic in accordance with some embodiments.

The embodiment of translation logic 900 shown in FIG. 9 is used to acquire an offset or a location in a data block in high-bandwidth memory 106 where a cache line from a page is to be located. As shown in FIG. 9, translation logic 900 includes bitmask 902, adders 904, and offset selection logic 906. As described above, bitmask 902 includes a single bit for each 64 B cache line in a corresponding 2 KB page in the main memory, i.e., 32 bits, that is set to 1 to indicate that the cache line was accessed and 0 to indicate that the cache line was not accessed. For example, position 0 in bitmask 902 is set to 1, indicating that the first 64 B cache line in the 2 KB page was accessed. Adders 904 include 32 ripple-carry adders. The adders output a sum of a previous input and the corresponding bit position in bitmask 902 that is used by offset selection logic 906 for outputting an offset 908 associated with a given request address (i.e., a location in the page where a corresponding cache line is located). As can be seen, the first adder has an input of −1, which may be 0 or another value in other embodiments, and simply helps to set the value of the ripple carry adders (which are then interpreted accordingly).

During operation, request address 910, which includes a number of bits that are logically designated as a page tag ("PT"), block offset ("BO"), channel ("CH"), and cache line offset ("CO") for this example, is received by translation logic 900. A combination of the page tag and the channel are used to index into the bitmask 902, i.e., to determine a position in bitmask 902. Based on a value output from the adder for the determined position and the block offset, offset selection logic 906 outputs an offset 908 that represents the location of the cache line in the data block in high-bandwidth memory 106. For example, given a request address that indicates cache line 29 in the 2 KB page, offset selection logic 906 returns an offset 908 having a value representing the second element of the data block in high-bandwidth memory 106.

In the described embodiments, as can be seen in FIG. 9, cache lines from locations in a 2 KB page 912 in main memory 104 are packed (i.e., combined in sequence) in a data block 914 in high-bandwidth memory 106. The translation logic enables the determination of the packing as described above. For example, the translation logic enables the determination that the 29th cache line in page 912 is to be stored in the third position of data block 914.

The embodiment of translation logic shown in FIG. 10 is used to acquire an offset or location in main memory 104 where a cache line is located. As shown in FIG. 10, translation logic 900 includes, along with bitmask 902 and adders 904 (which are not labeled for clarity), tri-state buffers 1000. The function of bitmask 902 and adders 904 in translation logic 900 is similar to that described above for FIG. 9. The tri-state buffers 1000 ensure that the input value of the tri-state buffer flows through to offset matching logic 1002 only in positions where the bitmask has a 1.

During operation, request address 910, which includes a number of bits that are logically designated as a page tag ("PT"), block offset ("BO"), channel ("CH"), and cache line offset ("CO") for this example, is received by translation logic 900. A combination of the page tag and the channel are used to index into the bitmask 902, i.e., to determine a position in bitmask 902. Based on a value output from the adder for the determined position, offset matching logic 1002 outputs an offset 908 that represents the location of the cache line in the page in main memory 104. For example, given a request address that indicates cache line 2 in the data block in high-bandwidth memory 106, offset selection logic 906 returns an offset 908 having a value representing the 29th element of the 2 KB page in main memory 104.

In the described embodiments, as can be seen in FIG. 10, cache lines from data block 914 in high-bandwidth memory 106 can be mapped to locations in a 2 KB page 912 in main memory 104. The translation logic enables the determination of the mapping as described above. For example, the translation logic enables the determination that the third cache line in data block 914 is to be stored in the 29th position of page 912.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), controllers, memory management units (e.g., IOMMUs, MMUs, etc.), compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
   a processor;
   a main memory;
   a high-bandwidth memory (HBM) that is used as a cache by the processor for storing cache lines acquired from the main memory; and
   a plurality of channels coupled between the processor and the HBM, each channel comprising a set of signal routes for accessing data stored in a corresponding portion of the HBM;
   wherein the computing device is configured to:
      set, for each channel of the plurality of channels, a respective channel data block size, the channel data block size indicating a number of cache lines that are to be included in data blocks that are stored in a portion of the HBM that is accessed via that channel;
      set, for pages in the main memory, respective page data block sizes, the page data block size for each of the pages being set based on a record of accesses of cache lines stored in the HBM that were acquired from that page, and the page data block size being a number of cache lines;

select a given channel from among the plurality of channels to be used for storing, in the HBM, data blocks acquired from each of the pages based on a relative size of the page data block size for that page and the channel data block size for each channel; and store, in the HBM, data blocks acquired from each of the pages using the given channel for that page.

2. The computing device of claim 1, wherein the computing device is further configured to:

upon storing, in the HBM, a data block comprising cache lines acquired from a given page, monitor accesses of the data block, the monitoring comprising detecting which of the cache lines are accessed; and generate a record of accesses of cache lines, the record of accesses of cache lines associated with the given page and indicating cache lines that were accessed.

3. The computing device of claim 2, wherein the computing device is further configured to:

store, in the HBM, the data block comprising cache lines acquired from the given page, the storing comprising:

based on the indication of the cache lines that were accessed in the record of accesses of cache lines, acquiring, for the data block, cache lines from corresponding portions of the given page.

4. The computing device of claim 3, wherein the computing device is further configured to:

write back cache lines from the data block stored in the HBM to the main memory, the writing back comprising:

based on the indication of the cache lines that were accessed in the record of accesses of cache lines, writing back, from the data block, the cache lines into corresponding portions of the given page.

5. The computing device of claim 4, wherein the record of accesses of cache lines are bit vectors, with each position in each bit vector including a value indicating whether a corresponding cache line was accessed, and wherein the computing device further comprises:

translation logic, the translation logic comprising circuit elements for generating, based on the bit vector, a mapping of the portions of pages from which cache lines are to be acquired and to which cache lines are to be written back.

6. The computing device of claim 2, wherein the computing device is further configured to:

upon storing, in the HBM, the data block comprising cache lines acquired from the given page, reset an existing record of accesses of cache lines for the given page, thereby enabling updating the record of accesses of cache lines in the given page.

7. The computing device of claim 1, wherein setting, for each channel of the plurality of channels, the respective channel data block size comprises:

at one or more times while the computing device is executing a workload:

detecting, for the workload, a pattern of data accesses of cache lines in data blocks stored in the HBM;

based on the pattern of data accesses, identifying an arrangement of cache line sizes for the workload; and based on the arrangement of cache line sizes, setting the respective channel data block size for each of the plurality of channels so that blocks of data stored in the corresponding portions of the HBM are of the corresponding sizes.

8. The computing device of claim 1, wherein setting, for each channel of the plurality of channels, the respective channel data block size comprises:

setting the respective channel data block size for two or more of the plurality of channels so that data blocks stored in the corresponding portions of the HBM include different numbers of cache lines.

9. The computing device of claim 1, further comprising:

a package, the processor and HBM being coupled together in the package, wherein the main memory is separate from and external to the package.

10. A method for storing data in a high-bandwidth memory (HBM) used as a cache for data acquired from a main memory in a computing device, the computing device including a plurality of channels coupled between a processor and the HBM, each channel having a set of signal routes for accessing data stored in a corresponding portion of the HBM, the method comprising:

setting, for each channel of the plurality of channels, a respective channel data block size, the channel data block size indicating a number of cache lines that are to be included in data blocks that are stored in a portion of the HBM that is accessed via that channel;

setting, for pages in the main memory, respective page data block sizes, the page data block size for each of the pages being set based on a record of accesses of cache lines stored in the HBM that were acquired from that page, and the page data block size being a number of cache lines;

selecting a given channel from among the plurality of channels to be used for storing, in the HBM, data blocks acquired from each of the pages based on a relative size of the page data block size for that page and the channel data block size for each channel; and storing, in the HBM, data blocks acquired from each of the pages using the given channel for that page.

11. The method of claim 10, further comprising:

upon storing, in the HBM, a data block comprising cache lines acquired from a given page, monitoring accesses of the data block, the monitoring comprising detecting which of the cache lines are accessed; and generating a record of accesses of cache lines, the record of accesses of cache lines associated with the given page and indicating cache lines that were accessed.

12. The method of claim 11, further comprising:

storing, in the HBM, the data block comprising cache lines acquired from the given page, the storing comprising:

based on the indication of the cache lines that were accessed in the record of accesses of cache lines, acquiring, for the data block, cache lines from corresponding portions of the given page.

13. The method of claim 12, further comprising:

writing back cache lines from the data block stored in the HBM to the main memory, the writing back comprising:

based on the indication of the cache lines that were accessed in the record of accesses of cache lines, writing back, from the data block, the cache lines into corresponding portions of the given page.

14. The method of claim 13, wherein the record of accesses of cache lines are bit vectors, with each position in each bit vector including a value indicating whether a corresponding cache line was accessed, and wherein the method further comprises:

generating, based on the bit vector, using translation logic, a mapping of the portions of pages from which cache lines are to be acquired and to which cache lines are to be written back.

15. The method of claim 11, further comprising:

upon storing, in the HBM, the data block comprising cache lines acquired from the given page, resetting an existing record of accesses of cache lines for the given page, thereby enabling updating the record of accesses of cache lines in the given page.

16. The method of claim 10, wherein setting, for each channel of the plurality of channels, the respective channel data block size comprises:

at one or more times while the computing device is executing a workload:

detecting, for the workload, a pattern of data accesses of cache lines in data blocks stored in the HBM;

based on the pattern of data accesses, identifying an arrangement of cache line sizes for the workload; and based on the arrangement of cache line sizes, setting the respective channel data block size for each of the plurality of channels so that blocks of data stored in the corresponding portions of the HBM are of the corresponding sizes.

17. The method of claim 10, wherein setting, for each channel of the plurality of channels, the respective channel data block size comprises:

setting the respective channel data block size for two or more of the plurality of channels so that data blocks stored in the corresponding portions of the HBM include different numbers of cache lines.

* * * * *